(12) United States Patent
MacDonald et al.

(10) Patent No.: US 11,005,414 B2
(45) Date of Patent: May 11, 2021

(54) SOLAR MODULE MOUNTING

(71) Applicant: Vivint Solar, Inc., Lehi, UT (US)

(72) Inventors: Willard S. MacDonald, Lehi, UT (US); Gregory N. Nielson, Lehi, UT (US); Roger L. Jungerman, Lehi, UT (US)

(73) Assignee: Vivint Solar, Inc., Lehi, UT (US)

( * ) Notice: Subject to any disclaimer, the term of this patent is extended or adjusted under 35 U.S.C. 154(b) by 0 days.

(21) Appl. No.: 16/438,333

(22) Filed: Jun. 11, 2019

(65) Prior Publication Data

US 2019/0334472 A1 Oct. 31, 2019

Related U.S. Application Data

(63) Continuation of application No. 15/265,110, filed on Sep. 14, 2016, now Pat. No. 10,361,652.

(60) Provisional application No. 62/218,360, filed on Sep. 14, 2015.

(51) Int. Cl.
| | |
|---|---|
| *H02S 20/23* | (2014.01) |
| *H02S 20/00* | (2014.01) |
| *F24S 25/61* | (2018.01) |
| *F24S 25/63* | (2018.01) |
| *F24S 25/70* | (2018.01) |
| *F24S 25/636* | (2018.01) |
| *F24S 25/40* | (2018.01) |
| *F24S 25/60* | (2018.01) |

(52) U.S. Cl.
CPC ............ *H02S 20/23* (2014.12); *F24S 25/40* (2018.05); *F24S 25/61* (2018.05); *F24S 25/63* (2018.05); *F24S 25/636* (2018.05); *F24S 25/70* (2018.05); *H02S 20/00* (2013.01); *F24S 2025/601* (2018.05); *Y02B 10/10* (2013.01); *Y02B 10/20* (2013.01); *Y02E 10/47* (2013.01); *Y02E 10/50* (2013.01)

(58) Field of Classification Search
CPC .......... H02S 20/23; H02S 20/00; F24S 25/40; F24S 25/70; F24S 25/63; F24S 25/636; F24S 25/61; F24S 2025/601; Y02B 10/20; Y02B 10/12; Y02E 10/47; Y02E 10/50
USPC ........................................................ 52/173.3
See application file for complete search history.

(56) References Cited

U.S. PATENT DOCUMENTS

| | | | | |
|---|---|---|---|---|
| 4,636,577 A | * | 1/1987 | Peterpaul ................ | F24S 20/67 136/206 |
| 5,986,203 A | * | 11/1999 | Hanoka ............. | B32B 17/10018 136/251 |
| 6,300,555 B1 | * | 10/2001 | Kondo ................... | H01L 31/048 136/244 |
| 7,435,134 B2 | * | 10/2008 | Lenox ...................... | H01R 4/64 439/567 |
| 7,469,508 B2 | * | 12/2008 | Ceria ......................... | E04B 7/12 52/173.3 |
| 7,814,899 B1 | * | 10/2010 | Port ....................... | F24S 25/615 126/623 |

(Continued)

*Primary Examiner* — Joshua K Ihezie
(74) *Attorney, Agent, or Firm* — TraskBritt

(57) ABSTRACT

Embodiments of the present disclosure are related to solar module mounting systems. A system may include an adhesion sheet configured to be secured to a roof of a structure via an adhesive. The system may further include at least one clamp configured for securing at least one solar module to the adhesion sheet. Other embodiments are related to methods of attaching one or more solar modules to a structure.

12 Claims, 16 Drawing Sheets

(56) References Cited

U.S. PATENT DOCUMENTS

| | | | | |
|---|---|---|---|---|
| 8,418,419 B1* | 4/2013 | Aseere | H02S 20/24 | 52/173.3 |
| 8,793,941 B2* | 8/2014 | Bosler | E04D 3/3605 | 52/173.3 |
| 8,875,401 B2* | 11/2014 | Jolley | B23P 19/04 | 29/897.312 |
| 8,938,932 B1* | 1/2015 | Wentworth | H02S 20/23 | 52/747.1 |
| 8,991,116 B2* | 3/2015 | Richardson | H02S 20/23 | 52/173.3 |
| 9,136,411 B2* | 9/2015 | Jolley | B23P 19/04 | |
| 10,361,652 B2* | 7/2019 | MacDonald | F24S 25/636 | |
| 2002/0002972 A1* | 1/2002 | Blake | F24S 30/20 | 126/692 |
| 2003/0070368 A1* | 4/2003 | Shingleton | F24S 25/636 | 52/173.3 |
| 2006/0277845 A1* | 12/2006 | Warfield | H02S 20/23 | 52/173.1 |
| 2008/0245399 A1* | 10/2008 | DeLiddo | E04D 5/12 | 136/244 |
| 2009/0044850 A1* | 2/2009 | Kimberley | H02S 20/23 | 136/244 |
| 2009/0114261 A1* | 5/2009 | Stancel | H01L 31/05 | 136/244 |
| 2009/0178350 A1* | 7/2009 | Kalkanoglu | E04F 13/0864 | 52/173.3 |
| 2010/0236165 A1* | 9/2010 | Smith | H02S 20/23 | 52/173.3 |
| 2010/0236542 A1* | 9/2010 | Pierson | H02S 20/23 | 126/621 |
| 2010/0269428 A1* | 10/2010 | Stancel | H02S 20/23 | 52/173.3 |
| 2011/0185651 A1* | 8/2011 | Taylor | B32B 7/12 | 52/173.3 |
| 2011/0197524 A1* | 8/2011 | Sahlin | H01L 31/0481 | 52/173.3 |
| 2011/0232212 A1* | 9/2011 | Pierson | F24S 25/634 | 52/173.3 |
| 2012/0152350 A1* | 6/2012 | Kouyanagi | H02G 3/088 | 136/259 |
| 2012/0198779 A1* | 8/2012 | Tachino | F24S 25/61 | 52/173.3 |
| 2012/0279560 A1* | 11/2012 | Sumida | H01L 31/042 | 136/251 |
| 2013/0008102 A1* | 1/2013 | Bindschedler | E04D 11/007 | 52/173.3 |
| 2013/0118545 A1* | 5/2013 | Bosler | E04D 3/3605 | 136/244 |
| 2013/0125975 A1* | 5/2013 | Malik, Jr. | H05K 5/0247 | 136/256 |
| 2013/0186017 A1* | 7/2013 | Kassem | F24S 25/33 | 52/173.3 |
| 2014/0115980 A1* | 5/2014 | Edwards | E04D 13/152 | 52/173.3 |
| 2014/0158184 A1* | 6/2014 | West | H02S 20/00 | 136/251 |
| 2014/0167417 A1* | 6/2014 | Tang | E04D 13/103 | 290/50 |
| 2014/0318045 A1* | 10/2014 | Gezelman | H02S 20/23 | 52/173.3 |
| 2014/0355207 A1* | 12/2014 | Stephens | H01M 10/425 | 361/679.55 |
| 2015/0093190 A1* | 4/2015 | Header | E04D 13/10 | 403/374.3 |
| 2015/0288320 A1* | 10/2015 | Stearns | H02S 20/23 | 52/173.3 |
| 2016/0201331 A1* | 7/2016 | James | E04D 13/14 | 52/698 |

* cited by examiner

SOLAR MODULE MOUNTING

CROSS-REFERENCE TO RELATED APPLICATIONS

This application is a continuation of U.S. patent application Ser. No. 15/265,110, filed Sep. 14, 2016, now U.S. Pat. No. 10,361,652, issued Jul. 23, 2019, which claims the benefit of priority pursuant to 35 U.S.C. § 119(e) to the Sep. 14, 2015 filing date of the U.S. Patent Provisional Application No. 62/218,360, titled SOLAR MODULE MOUNTING SYSTEMS AND ASSOCIATED METHODS (the '360 Provisional Application), the disclosure of each of which is hereby incorporated herein in its entirety by this reference.

TECHNICAL FIELD

The present disclosure relates generally to solar module. More specifically, the present disclosure includes embodiments related to securing one or more solar modules to a structure.

BRIEF SUMMARY OF THE DISCLOSURE

According to one specific embodiment, a system may include one or more adhesion sheets configured to be secured to a roof of a structure. The system may also include at least one clamp configured for coupling to the one or more adhesion sheets and securing at least one solar module to the one or more adhesion sheets. Another embodiment may include an adhesive and an adhesion sheet secured to a roof of a structure via the adhesive. The adhesion sheet may be configured to couple to at least one solar module with an air-gap between the adhesion sheet and the at least one solar module.

In another specific embodiment, a system includes at least one adhesion sheet configured to be secured to a roof of a structure. Further, the system includes at least one standoff configured for coupling the at least one adhesion sheet to a solar module.

According to another embodiment, the present disclosure includes methods for mounting one or more solar modules to a structure (e.g., a roof of a residential or commercial structure). Various embodiments of such a method may include affixing one or more adhesion sheets to a roof of a structure. The method may also include coupling the one or more adhesion sheets to at least one solar module.

Other aspects, as well as features and advantages of various aspects, of the present disclosure will become apparent to those of skill in the art though consideration of the ensuing description, the accompanying drawings and the appended claims.

DETAILED DESCRIPTION

Referring in general to the accompanying drawings, various embodiments of the present disclosure are illustrated to show the structure for solar module mounting systems. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

Solar photovoltaic (PV) cells use light energy (photons) from the sun to generate electricity through a photovoltaic effect. A PV solar module includes PV cells mounted behind glass and typically includes a frame at least partially surrounding the edges of the cells and glass. A frameless PV module typically does not include a frame. A glass-glass PV module, as known in the art, is a frameless module that uses glass on the front and glass on the back of the module. A PV system, which may include a plurality of solar modules and various other electrical components, may be used to generate and supply electricity in utility, commercial and residential applications. Solar modules may also be of the type that converts energy from the sun into heat that is captured in a fluid running through collectors mounted behind glass. The heated fluid may then be used, for example, to heat water for use in a home, a pool, or a business. A solar hot water module typically includes a frame at least partially surrounding the edges of the glass and collectors.

One major cost of the solar industry is related to racking materials and labor required to attach solar modules to a roof. In 2015, the average cost of residential solar installations in the United States is about $4.93 per Watt. The cost of racking materials is approximately $0.25 per Watt. Further, according to the Rocky Mountain Institute, the average total cost of the installation labor is $0.49 per Watt and the cost of the labor associated with racking and mounting is $0.16 per Watt. Thus, total costs associated with racking is approximately $0.41 per Watt. It is desirable to reduce the cost of racking materials and associated labor.

Figure 1:
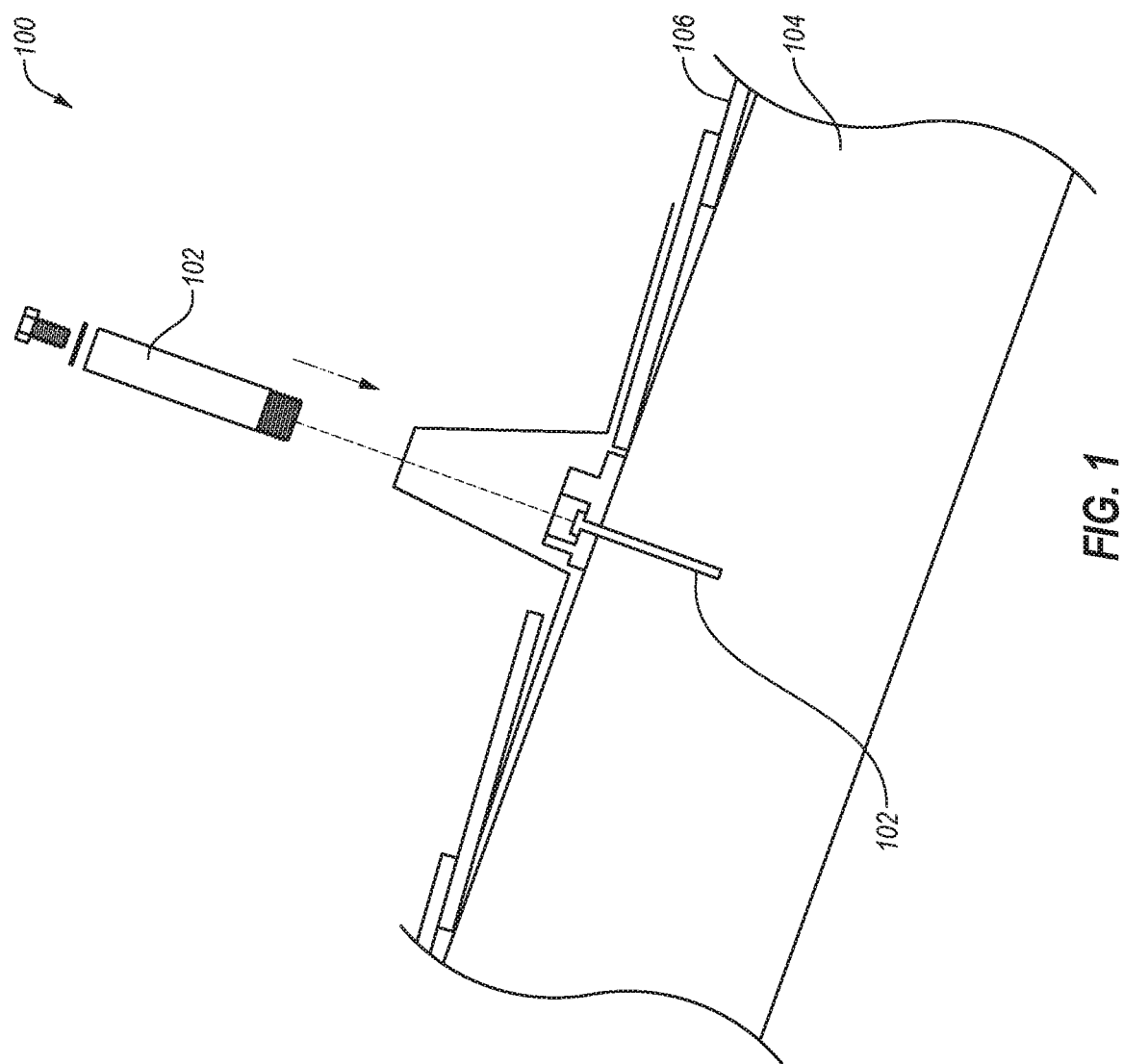
FIG. 1 illustrates a conventional solar module mounting system.

In conventional PV solar mounting systems, such as mounting system 100 illustrated in FIG. 1, holes are typically drilled through shingles, a waterproof roof membrane, and decking and into underlying rafters to attach the mounting system to a roof 106 of a structure 104 (e.g., a house) with a screw or a bolt 102. Further, lag bolts or screws are used to hold the feet of the mounting system to the roof. Flashing and caulking may be added to try to prevent roof leaks around the roof membrane penetrations. However, any penetrations to a roof are undesirable, and flashing may fail or be improperly installed. Furthermore, it can be challenging to locate the rafters with a drill and often many holes are drilled before the rafter is found, thus making the flashing installation and patching more challenging. Roof penetrations may worry some potential solar customers and prevent them from using solar energy because of the risk of leaks. Typical solar installation companies may see as much as 35% of all their customer repair claims related to roof leaks, and the cost of repairing these leaks can be millions of dollars per year. The steps of drilling, bolting, sealing and flashing are significant contributors to the labor and cost associated with installing a solar array.

In adhesive-based solar mounting systems, solar modules are attached directly to shingles (e.g., composition or asphalt shingles) or tiles (e.g., clay or cement tiles) using an adhesive. These systems only work for custom modules, and because a major surface of a solar module is adhered to a roof, heat of the module cells, which may reach 95 degrees Celsius in hot climates, may cause the adhesive to weaken or fail. Further, there is a minimal air-gap underneath a back sheet, thus, the solar module may not receive as much convective cooling compared to a more traditional mounting system, which may include a larger air-gap. As will be understood, the efficiency of PV solar modules is typically reduced at higher cell temperatures, which is undesirable. Furthermore, because there is not a significant gap underneath the modules, a junction box must be mounted on a top side of the solar module, thus, requiring some of the area that would have otherwise been filled with cells. This may reduce module efficiency and also may increase cost per watt.

Various embodiments of the present disclosure may provide low cost, low labor systems and methods for attaching a variety of solar modules to a structure (e.g., a roof of a residential or commercial structure) without penetrating a waterproof membrane of the structure and while taking advantage of an air-gap between a surface of a solar module (i.e., a bottom surface when installed) and a surface of an adhesion sheet and maintaining the cost and efficiency of the solar module.

As described more fully below, an adhesion sheet may be attached to a roof (e.g., shingles or tiles of a roof) with an adhesive. The adhesion sheet may comprise any suitable material that may be adhered to the roof and also attached to one or more solar modules. For example, the adhesion sheet may comprise aluminum sheet metal having a thickness of, for example only, 0.125 inch. In one embodiment wherein the adhesion sheet is a conductive metal, the adhesion sheet may be configured to provide electrical grounding to one or more solar modules (i.e., via electrical bonding). If the solar modules are frameless modules or have a non-conductive frame and do not require grounding, the adhesion sheet may comprise a non-conductive material, such as a plastic, polymer, glass, or epoxy-based material. Solar modules with a conductive frame can also utilize a non-conductive (i.e., plastic, polymer, glass, epoxy, etc.) adhesion sheet but a method for grounding the conductive frames of the module (e.g., via a grounding wire) may be necessary. Conversely, frameless solar modules or modules with non-conductive frames may utilize a conductive adhesion sheet. Further, the adhesion sheet may include one or more inserts (e.g., threaded male or female inserts) or standoffs (e.g., inserted standoffs, welded standoffs, integrated standoffs, attached standoffs, etc.) configured to receive and/or couple to one or more attachment devices (e.g., bolts, screws, nuts, or the like) of one or more clamps, as described more fully below.

As will be understood, a roof may be warped, may have a bow, and/or may have a roll. The adhesion sheets described herein may be rigid, semi rigid, or flexible and may be configured (e.g., with proper rigidness/flexibility) to follow the contour of a roof (e.g., one that is not a flat plane).

Further, an adhesion sheet, which is suitably flexible, may maintain surface area contact with the roof and contact with the adhesive.

In various embodiments, a solar module frame may be coupled to an adhesion sheet via one or more clamps, which may include one or more attachments devices configured for positioning in, or attaching to, one or more inserts or standoffs of the adhesion sheet. Further, the clamps may include one or more sharp points configured to "bite" into a solar module frame to provide bonding for electrical grounding between the module frame and the adhesion sheet. Stated another way, a clamp may be configured to puncture a solar module frame and provide bonding for electrical grounding between the module frame and the adhesion sheet. Further electrical bonding may be achieved via the threads or devices that connect the clamps to the adhesion sheet allowing a complete electrical grounding path from the module frame to the adhesion sheet. The clamps may be suitable for a module with a frame or may be suitable for a frame-less module, such as a glass-glass module.

The adhesive may be an adhesive suitable for adhering to both a roof (e.g., shingles or tiles) and the adhesion sheet. Non-limiting examples of adhesives manufacturers that may have suitable adhesive products include Royal Adhesives & Sealants of South Bend, Ind., Dow Corning Corporation of Midland, Mich., Sika Corporation of Lyndhurst, N.J., and 3M of St. Paul, Minn.

Figure 2:
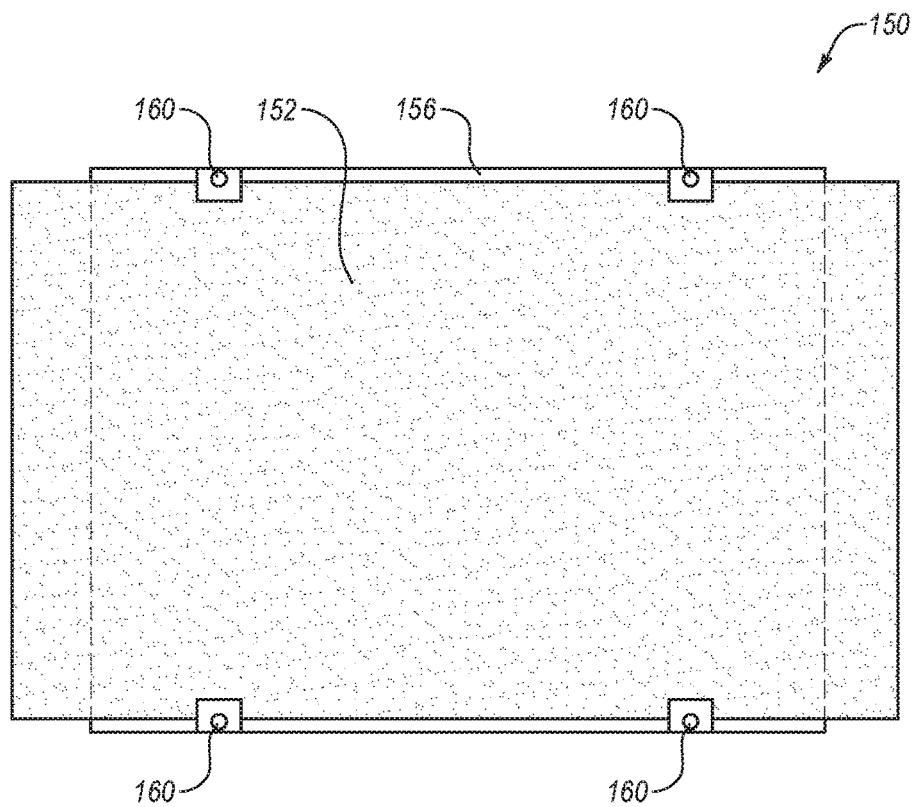
FIG. 2 depicts a solar module coupled to an adhesion sheet via a plurality of clamps, according to an embodiment of the present disclosure.
Figure 3:
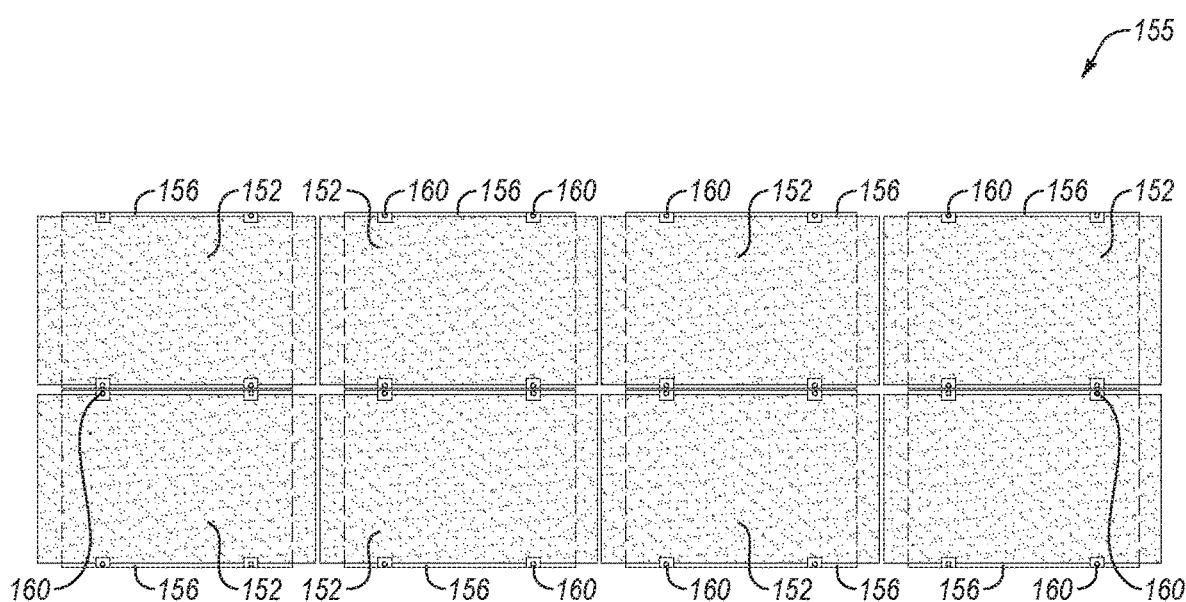
FIG. 3 depicts an array of solar modules coupled to a plurality of adhesion sheets, according to an embodiment of the present disclosure.

FIG. 2 depicts a system 150 including a solar module 152 coupled to an adhesion sheet 156 via clamps 160. FIG. 3 depicts a solar module array 155 including a plurality of adhesion sheets 156, a plurality of clamps 160, and a plurality of solar modules 152.

Figure 4:
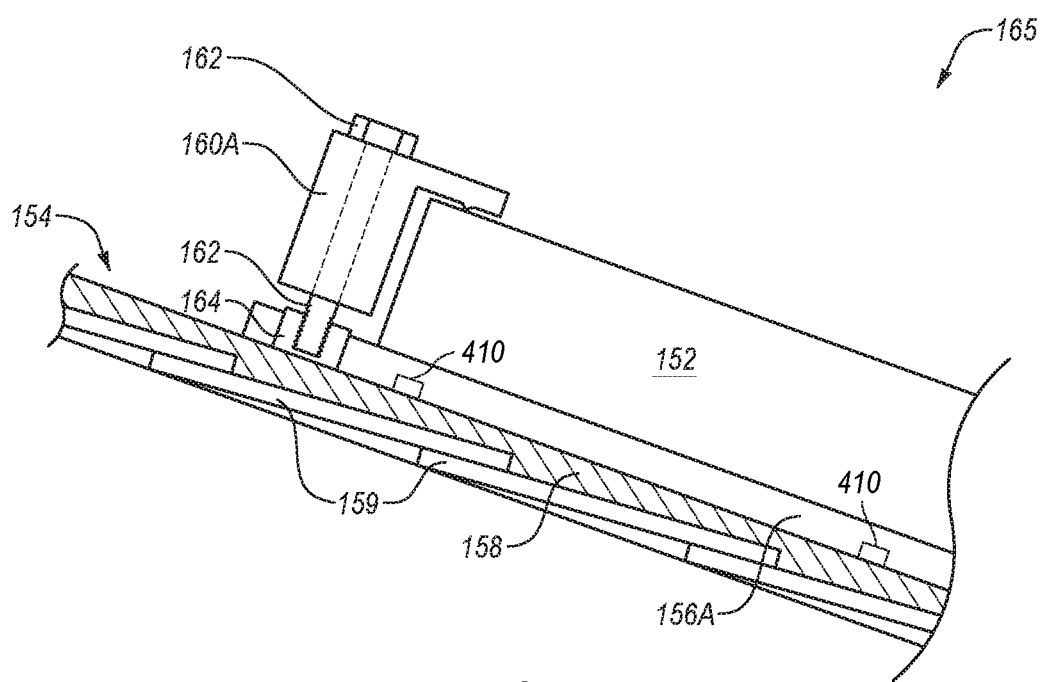
FIG. 4 illustrates a solar module mounting system including an adhesive, an adhesion sheet, and a clamp, in accordance with an embodiment of the present disclosure.

FIG. 4 depicts a solar module mounting system 165, according to an embodiment of the present disclosure. Mounting system 165, which is configured to couple solar module 152 to a roof structure 154 (e.g., a roof of a residential or commercial structure), includes an adhesion sheet 156A and an adhesive 158. Roof structure 154 may include, for example only, shingles 159. As will be appreciated, adhesion sheet 156A may be affixed to a surface of roof structure (i.e., shingles 159) with adhesive 158. In this embodiment, adhesion sheet 156A may include an insert 164, which may comprise, for example, a female threaded insert. In another example (not shown), insert 164 may comprise a male threaded insert. Further, adhesion sheet 156A may be coupled to one or more solar modules 152 with a clamp 160A. By way of example only, clamp 160A may include an attachment device 162 (e.g., bolt, screw, etc.) configured to be positioned within insert 164 of adhesion sheet 156A. In another example, when the insert 164 is a male insert, attachment device 162 may be a nut.

According to various embodiments, a solar module mounting system may be configured to adjust a height of one or more solar modules independently relative to a plane of a roof. This may provide a leveling function to improve aesthetics when a roof is not a substantially flat plane (e.g., it is warped or bowed). The adjustment may be made via a clamp, an adhesion sheet, a standoff, an insert, or any combination thereof. In one example, a threaded attachment device (e.g., a screw or bolt), when rotated, may cause a solar module to either raise or lower relative to the roof. In another example, one or more shims may be added under a frame of a solar module to raise the solar module.

Figure 5:
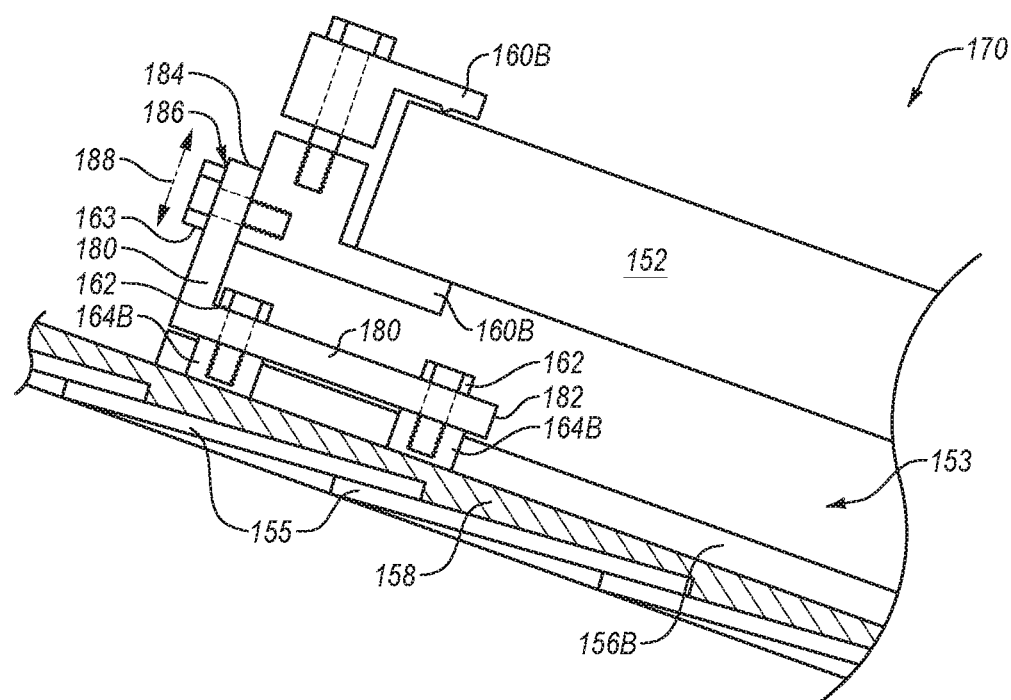
FIG. 5 illustrates another solar module mounting system including an adhesive, an adhesion sheet, an attachment member, and a clamp, in accordance with an embodiment of the present disclosure.
Figure 6:
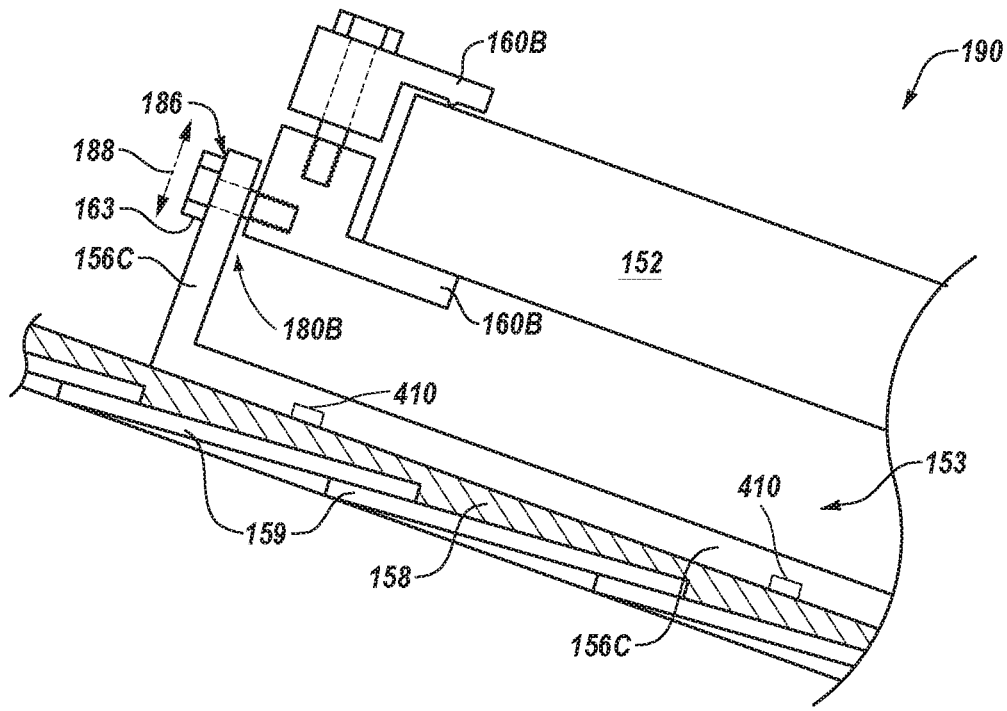
FIG. 6 illustrates another solar module mounting system including an adhesive, an adhesion sheet, and a clamp, according to an embodiment of the present disclosure.

With reference to FIG. 5, a solar module mounting system 170 may include an attachment member 180 configured to couple to a clamp 160B and an adhesion sheet 156B. Attachment member 180 may include an opening (e.g., a slot) 186 through one portion 184 (i.e., one leg of attachment member 180) and one or more openings (e.g., holes) on another portion 182 (i.e., another leg of attachment member 180). The one or more holes may allow for connection to adhesion sheet 156B (e.g., via one or more attachment devices 162 into female inserts 164B of adhesion sheet 156B or nuts onto male inserts (not shown)). When two or more holes are used, a weight of solar module 152 and/or lifting force from wind may be spread out on adhesion sheet 156B, which may comprise a thin material. Further, clamp 160B may be configured to couple to attachment member 180 via an attachment device 163 (e.g., bolt, screw, etc.) that extends through opening 186. It is noted that a position of solar module 152 and clamp 160B relative to adhesion sheet 156B is adjustable in the directions indicated by arrows 188. More specifically, a position of attachment device 163, which extends through opening 186 of portion 184, may be adjusted relative to adhesion sheet 156B in the directions indicated by arrows 188. An air-gap 153, having a size that is adjustable, may exist between solar module 152 and adhesion sheet 156B. FIG. 6 depicts another solar module mounting system 190. In contrast to mounting system 170 (see FIG. 5) wherein attachment member 180 is coupled to adhesion sheet 156B, an adhesion sheet 156C of solar module mounting system 190 comprises an attachment member. For example only, when the adhesion sheet 156C is a sheet metal material, an attachment member may be a section of the sheet metal that has been bent up 90 degrees to form vertical attachment member 180B.

Figure 7:
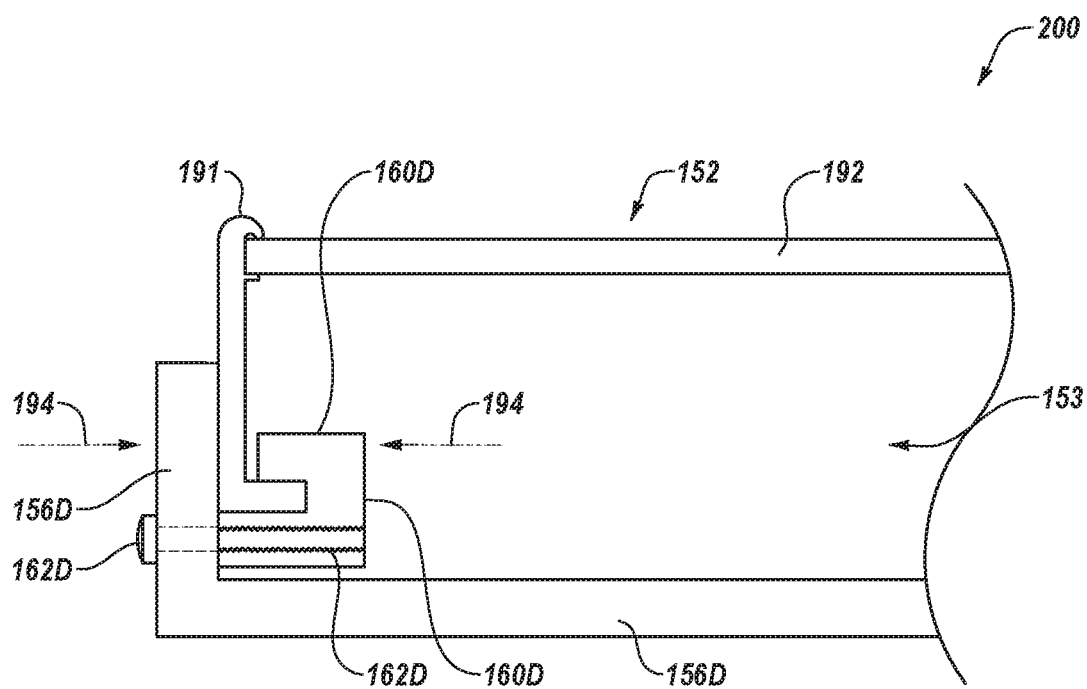
FIG. 7 illustrates another solar module mounting system including an adhesive, an adhesion sheet, and a clamp, in accordance with an embodiment of the present disclosure.
Figure 8:
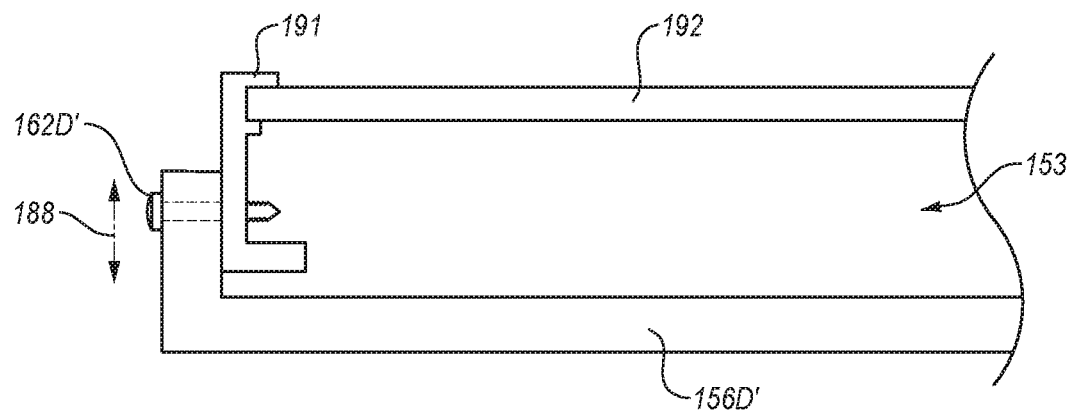
FIG. 8 depicts another solar module mounting system comprising an adhesion sheet directly coupled to a frame of a solar module, in accordance with an embodiment of the present disclosure.

It is noted that various clamps described herein may create a clamping force (e.g., in a direction substantially perpendicular to the plane of a glass portion of a solar module, in a direction substantially parallel to the plane of a glass portion of a solar module, or in a direction that includes vector components in both directions) that secures the solar module frame or glass (e.g., in a glass-glass module) to an adhesion sheet, clamp, rail, or standoff. In one embodiment, a solar module mounting system 200, as illustrated in FIG. 7, may include a clamp 160D configured to apply a clamping force (i.e., in a direction as indicated by arrows 194) that clamps module frame 191. Module frames may include a flat portion that is perpendicular to the plane of module glass 192. A clamping force in a direction parallel to the plane of the module glass may clamp this flat portion between an attachment member of adhesion sheet 156D and clamp 160D, which is attached to adhesion sheet 156D via an attachment device 162D. In another embodiment shown in FIG. 8, a clamp is not required and module frame 191 is attached directly to an adhesion sheet 156D' via attachment device 162D'. In this case, attachment device may comprise, for example, a self-tapping sheet metal screw that threads into solar module mounting system 190. In this embodiment, a grounding bond may occur via the threads of attachment device 162D' and solar module mounting system 190 and also between the adhesion sheet 156D' and attachment device 162D' (e.g., via a lock washer, toothed lock washer, star washer, or biting teeth on the mating side of the screw head (not shown)). In another embodiment, clamp 160D (see FIG. 7) may be part of adhesion sheet 156D'. In the embodiments of FIGS. 6-9, a position of solar module 152 relative to adhesion sheet 156 may be adjusted in a direction perpendicular to arrows 194 and perpendicular to the plane of the module glass 192 or in the direction of arrows 188. Further, in some embodiments, clamp 160D may include a grounding bond.

Figure 9:
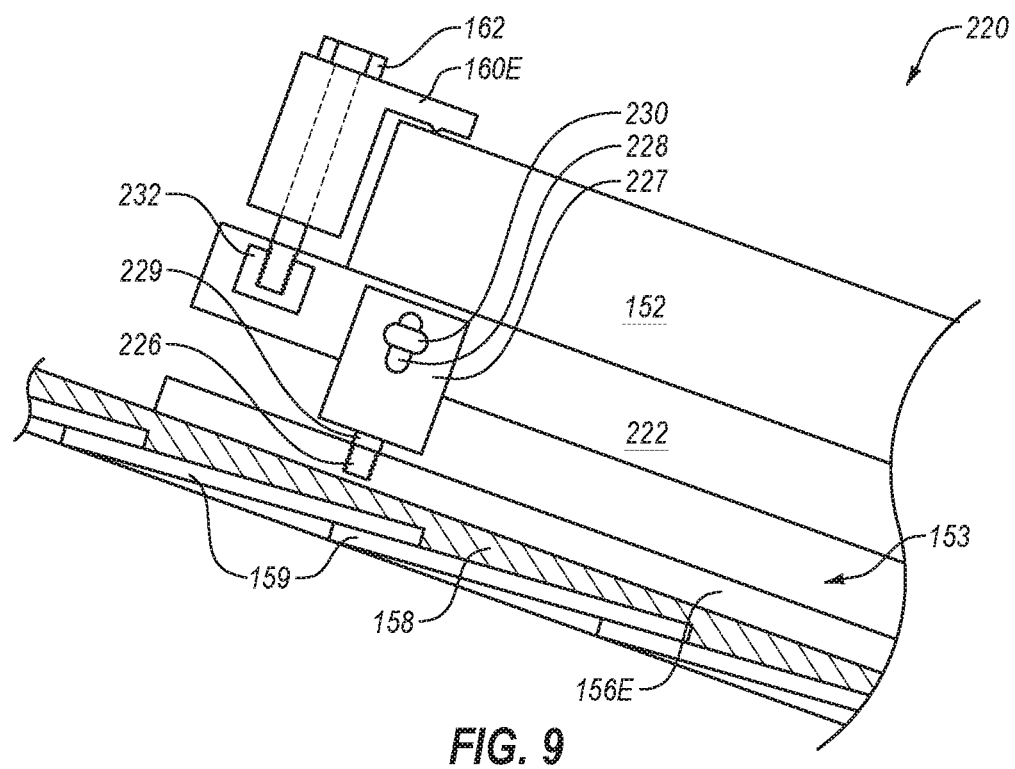
FIG. 9 illustrates another solar module mounting system including an adhesive, an adhesion sheet, a racking rail, and a clamp, according to an embodiment of the present disclosure.

FIG. 9 depicts another mounting system 220, according to an embodiment of the present disclosure. Mounting system 220 includes adhesion sheet 156E, clamp 160E, and a racking rail 222, which may be configured to couple to each of clamp 160E and adhesion sheet 156E. As illustrated, racking rail 222 may be coupled to adhesion sheet 156E via a bracket 227, attachment device 229, an insert 226 (i.e., of adhesion sheet 156E; configured to receive attachment device 229), and attachment device 230. Insert 226 may be, for example, a female threaded insert, a male threaded insert, or any other insert sufficient to attach adhesion sheet 156E to bracket 227. Or bracket 227 may be part of adhesion sheet 156E. Attachment device 230 may extend through opening 228 (e.g., a slot) of bracket 227 to couple bracket 227 to racking rail 222. As will be appreciated, a position of attachment device 230 within opening 228 may be adjusted to adjust a position of racking rail 222 and solar module 152 relative to adhesion sheet 156E, thus, adjusting a size of air-gap 153. Further, clamp 160E may couple solar module 152 to racking rail 222 via attachment device 162 and insert 232, which may be part of racking rail 222 or may be a separate device that is captured inside racking rail 222. This embodiment may allow the use of standard "off the shelf" racking components for some pieces of mounting system 220, potentially allowing for electrical bonding, adjustability (e.g., in a direction perpendicular to a surface of a roof), wire management, and skirt accessories of a standard racking system.

As will be understood by a person having ordinary skill in the art, PV solar systems are sometimes financed by third parties. Thus, it is important that PV equipment does not become a "fixture" of a structure (e.g., house), so that the financing party can maintain ownership and lien rights to the PV equipment. Solar modules that are directly adhered to a roof of a structure may be considered a fixture by some entities. Various embodiments described herein may eliminate this issue because modules may attach to an adhesion sheet in the same way they attach to a traditional racking system (e.g., with removable clamps, screws, or other fasteners). Hence, the concern around non-fixtured PV equipment may be avoided.

As will be appreciated, one or more solar modules of the systems described herein may be removed by removing one or more clamps, screws, or other fasteners. Further, an adhesion sheet may be removed by, for example, heating an adhesive to a high temperature with, for example, a heating blanket. When the adhesive reaches a certain temperature (e.g., 100 degrees Celsius), the adhesive may become soft and may release when the adhesion sheet is lifted.

Figure 10:
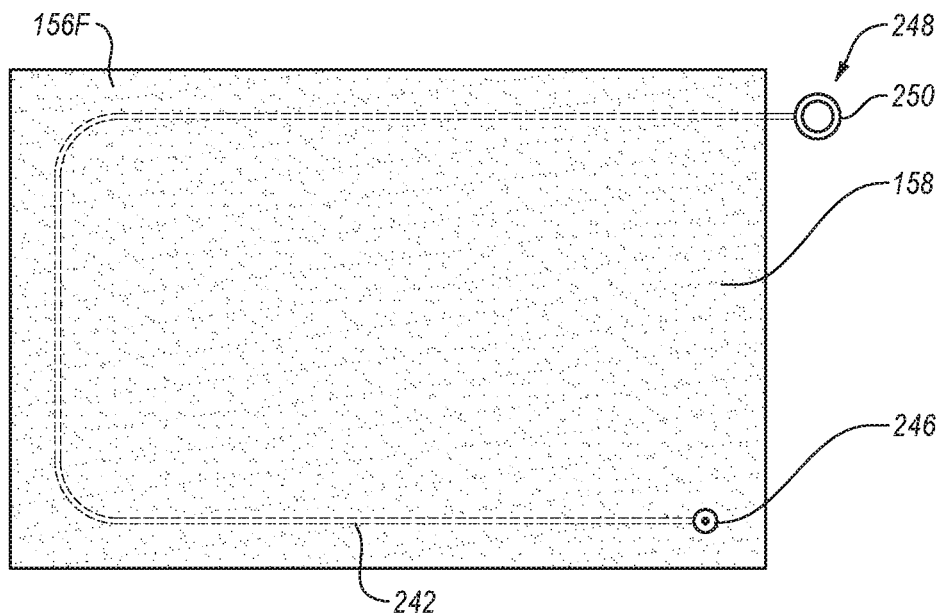
FIG. 10 depicts a cut string positioned on an adhesion sheet, according to an embodiment of the present disclosure.

Another embodiment illustrated in FIG. 10 includes an adhesive cut string 242. In one example, one end 246 of cut string 242 may be secured to a portion (e.g., a bottom side corner) of an adhesion sheet 156F (e.g., with a rivet or screw). Cut string 242 may then be routed around a perimeter of a side of adhesion sheet 156F encircling adhesive 158. Cut string 242 may be temporarily held in place (e.g., with tape) while adhesive 158 is applied. On another end 248, cut string 242 may include a pull loop or pull ring 250. After adhesion sheet 156F is adhered to a roof, pulling on ring 250 may cause cut string 242 to cut through adhesive 158, thus, separating adhesion sheet 156F from the roof. Adhesive cut string 242 may comprise, for example only, a suitably strong thin piece of metal, wire, cable, carbon fiber, or other material that when pulled may cut through adhesive 158 (e.g., like a string used to cut clay or cheese, or like a cable saw).

Figure 11:
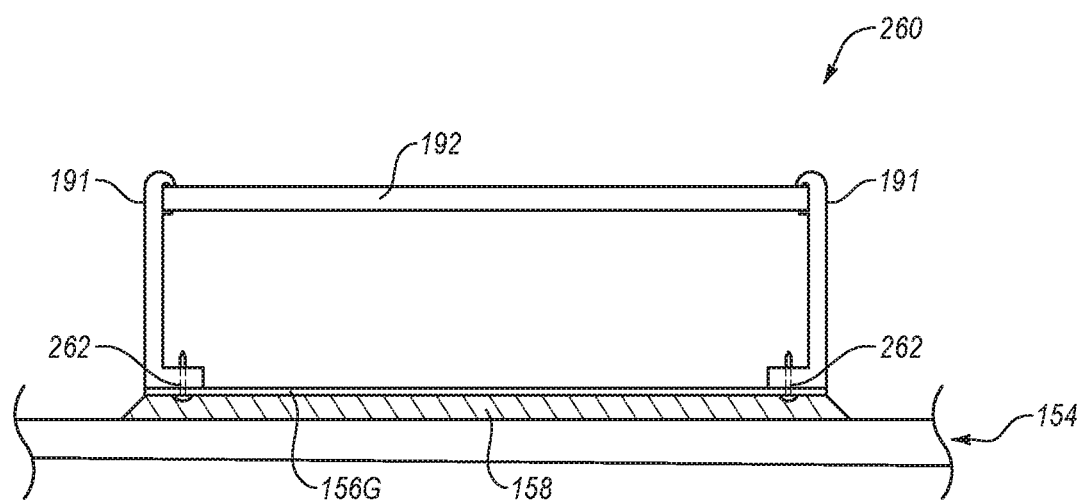
FIG. 11 illustrates another solar module mounting system including an adhesive and an adhesion sheet, in accordance with an embodiment of the present disclosure.

FIG. 11 depicts another embodiment of a solar module mounting system 260. Solar module mounting system 260 includes an adhesion sheet 156G, which, in this embodiment, may comprise sheet metal having a thickness of, for example only, substantially 0.0313 inch. Further, adhesion sheet 156G may be fastened directly to module frame 191 with, for example, screws or rivets 262.

In another embodiment, a solar module may be coupled to an adhesion sheet with an adhesive and without clamps. If the solar module is a framed module, a bottom surface of the frame may be adhered to a top surface of the adhesion sheet. If the module is a frameless module, a bottom portion of the module (e.g., back sheet or back glass (i.e., in a glass-glass module)) may be adhered to a top surface of the adhesion sheet. When the adhesion sheet is in contact with the module (e.g., the back sheet or back glass), the adhesion sheet may act as a heat sink that may draw heat away from the module cells. This may improve the conversion efficiency of the modules by lowering their operating temperature.

As non-limiting examples, adhesives that may provide adequate adhesion between a solar module and the adhesion sheet include silicon (PV-8301, PV-8303, and PV-8030) from Dow Corning Corporation, silicon (AS-785 and AS-70) from Sika Corporation, and solar acrylic foam tape from 3M.

In another embodiment, a solar module may be adhered to a surface of a roof without an adhesion sheet. If the module is a framed module, a bottom surface of the frame may be adhered to a top surface of the roof (e.g., the shingles or tiles). If the module is a frameless module, a back sheet or back glass (i.e., in a glass-glass module) may be adhered to a top surface of the roof. A heating blanket and/or a cut string may be used for removing a solar module from a roof surface, if needed.

Figure 12:
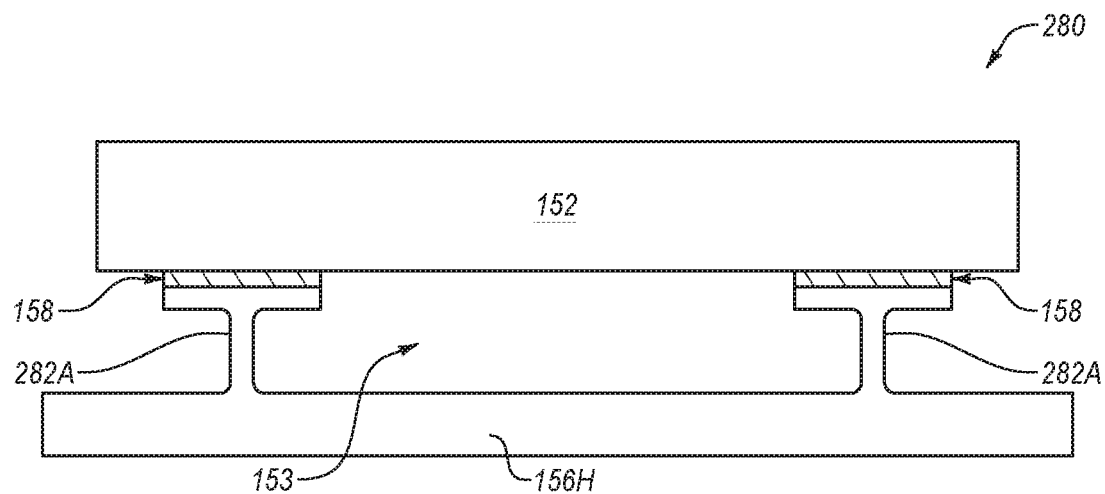
FIG. 12 illustrates another solar module mounting system including a plurality of standoffs, according to an embodiment of the present disclosure.
Figure 13:
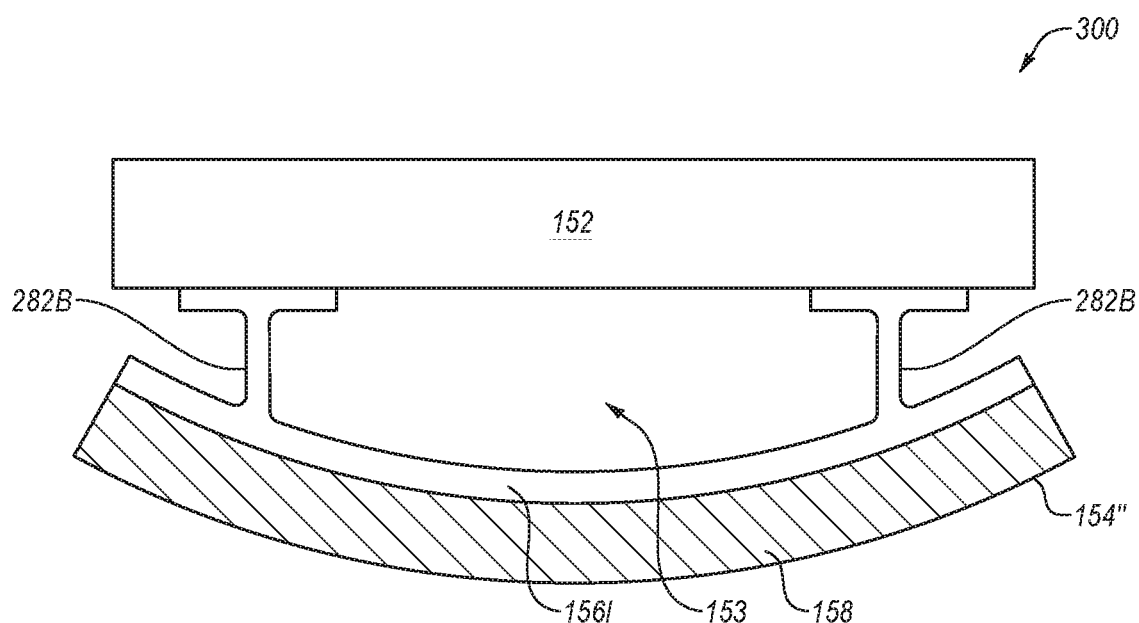
FIG. 13 illustrates another solar module mounting system including a plurality of standoffs, according to an embodiment of the present disclosure.

In various embodiments, one or more standoffs may be positioned between an adhesion sheet and a solar module. FIGS. 12 and 13 respectively illustrate solar module mounting systems 280 and 300, each of which including standoffs 282. A standoff may be adhered or attached to a portion (e.g., a top side) of an adhesion sheet, or may be part of an adhesion sheet, as shown in FIGS. 12 and 13. Further, a surface (e.g., a top surface) of standoffs 282A and 282B may be adhered to a portion (e.g., a frame, back sheet or bottom glass) of solar module 152. In one example, standoffs may be ridges that run the length or width of a solar module. In another example, standoffs may be posts or pillars that are circular, oval, or rectangular and only contact a limited internal area of the back of the module (e.g., standoffs do not run the length or width of a module). Positioning one or more standoffs internal to the area of solar module 152, rather than the traditional location of supports and clamps (i.e., along the edges of a solar module), may optimally distribute the weight of solar module 152 and any loading on solar module 152. This may reduce the cost of solar module 152 by allowing the module glass to be thinner due to the narrower span or eliminating the need for frames in a standard single glass module. An adhesion sheet (e.g., adhesion sheet 156H of FIG. 12 or adhesion sheet 156I of FIG. 13) may extend beyond the peripheral edges of solar module 152 to provide some protection when handling (e.g., when adhesion sheet is attached to module prior to handling), or adhesion sheet 156 may be smaller than the dimensions of solar module 152.

In one embodiment of a solar module array that does not include edge clamps, solar modules may be installed edge-to-edge without any gap between adjacent modules, thus, enhancing the aesthetics and improving the use of roof space (typically edge clamps require an approximately 0.5 to 1 inch gap between modules, thus, for example, a row of five modules, may need an extra 2.5 to 5 inches of run). In another embodiment, when bifacial solar modules (e.g., modules that generate energy from sunlight impinging on the bottom as well as the top surface of the module) are used, a surface of an adhesion sheet (i.e., a surface facing a solar module) may be reflective to maximize an amount of sunlight that is reflected back to an underside of the solar module.

As will be appreciated, PV modules that use a glass layer may not be very flexible, whereas roofs may be warped or bowed. However, there may be a need to maintain surface area contact between an adhesion sheet and the roof. In one embodiment, adhesion sheet 156I (see FIG. 13) may be suitably flexible to follow a shape of a surface of a roof 154". In this case, standoffs 282B may also be flexible (e.g., made of a flexible material such as plastic or polymer) or articulated (e.g., have a hinge or joint such as a ball joint). This may allow adhesion sheet 156I to maintain surface area contact with the roof and adhesive 158 while also allowing standoffs 282B to maintain surface area contact with a substantially flat surface of solar module 152 and adhesive 158, as shown in FIG. 13.

In another embodiment, the standoffs may include a height adjustment device. In this embodiment, for example, one or more standoffs may include a threaded member that when rotated (e.g., with a wrench) adjust a position (e.g., height) of a solar module relative to a surface of the roof. This may be useful when leveling one or more solar modules or when the surface of the roof is not flat.

Figure 14:
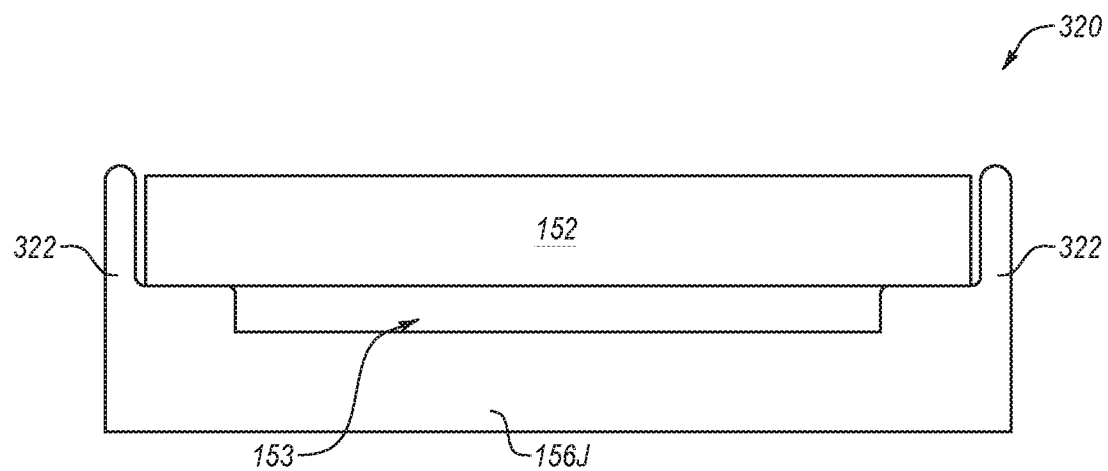
FIG. 14 illustrates another solar module mounting system including a plurality of standoffs, in accordance with an embodiment of the present disclosure.

In another embodiment illustrated in FIG. 14, a solar module mounting system 320 may include standoffs 322, which may provide protection to solar module 152. More specifically, for example, standoffs 322 may help prevent damage to corners or edges of solar module 152, especially if solar module 152 is a frameless module. In addition, if air-gap 153 beneath the module is relatively large, wind loading in strong winds can create upwards pressure, which tends to pull solar module 152 from adhesion sheet 156J, or adhesion sheet 156J can lose adhesion to the roof. The standoffs 322 can act as wind deflectors to keep the wind out of air-gap 153 beneath the module, reducing the wind pressure. This embodiment may allow a solar module to be coupled to adhesion sheet 156J and standoffs 322 at a warehouse or factory, so the solar module is less likely to be damaged in transportation and/or handling, especially while being hoisted onto a roof. In the embodiment of FIG. 14, solar module 152 may be adhered to standoffs 322. In another embodiment, a solar module mounting system may include mechanical clamps that couple to (e.g., screw into) standoffs 322 and secure a solar module. The standoffs may support and protect only a portion of the module edges (e.g., 2 to 4 inches in four locations around the perimeter of the module) or they may support and protect all of the module edges (e.g., the entire perimeter of the module).

Figure 15:
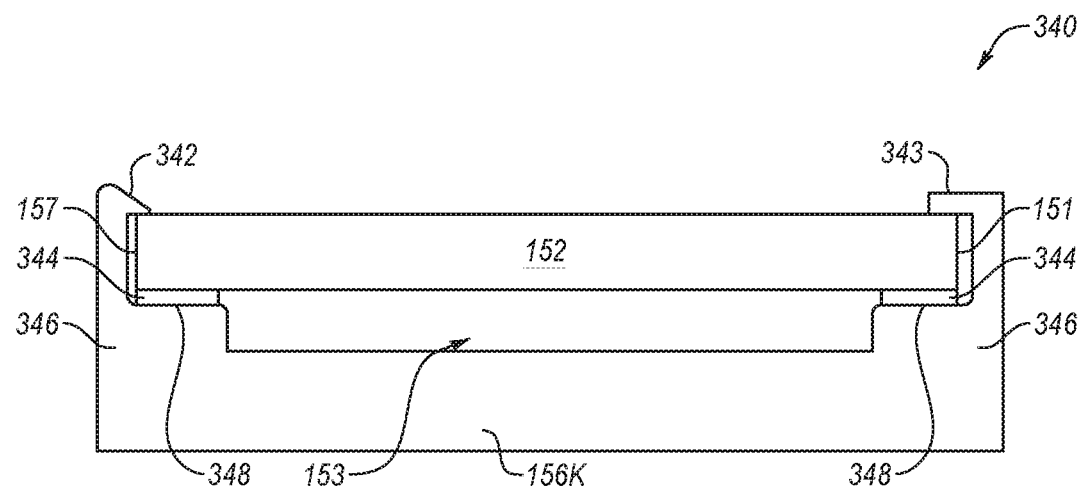
FIG. 15 illustrates another solar module mounting system including a snap-in tab, according to an embodiment of the present disclosure.

In another embodiment, a standoff, an adhesion sheet, a clamp, or any combination thereof, may include one or more snap-in tabs, which may allow for a solar module to be quickly secured, possibly without tools (e.g., a wrench). In one example, as depicted in solar module mounting system 340 of FIG. 15, a portion (e.g., an edge) 151 of solar module 152 may be inserted under a substantially non-bending catch 343. Catch 343 may be coupled to, or may be part of, standoffs 346, adhesion sheet 156K, a clamp (not shown in FIG. 15), or any combination thereof. Another portion (e.g., another edge) 157 of solar module 152 may be positioned onto a snap-in tab 342, which is configured to bend (i.e., out of the way of solar module 152) as solar module 152 is pressed down. Snap-in tab 342 may then snap back to its default position (as illustrated) to secure solar module 152 when solar module 152 is fully seated. A compliant material 344, such as foam weather stripping or rubber, may be included between a supporting area 348 and solar module 152 to provide a spring force, if needed.

Figure 16:
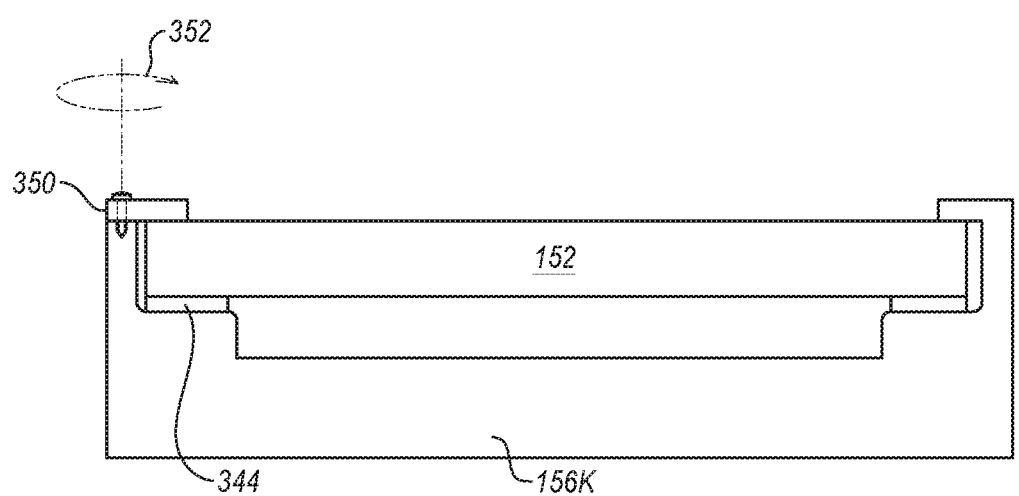
FIG. 16 depicts another solar module mounting system including a rotation member, in accordance with an embodiment of the present disclosure.

In another embodiment shown in FIG. 16, one or more clamps 350 may comprise rotation members (e.g., quarter-rotation members) configured to be attached to one or more standoffs and/or an adhesion sheet via a pivot, such as a screw. When rotated (e.g., a quarter turn (i.e., 90 degrees), as depicted by reference numeral 352), one or more clamps 350 may secure the solar module (e.g., clamp the solar module in place). In this embodiment, the one or more clamps may be pre-integrated with standoffs or an adhesion sheet. The rotation members may be used along one or more edges of the module.

Figure 17A:
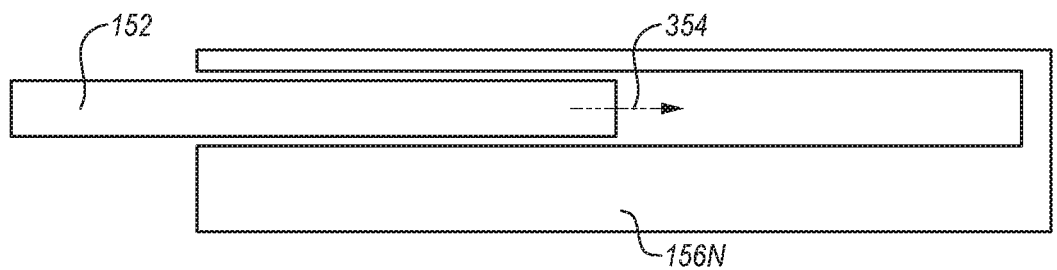
FIGS. 17A and 17B depict solar module mounting systems including slots for receiving a solar module, according to an embodiment of the present disclosure.
Figure 17B:
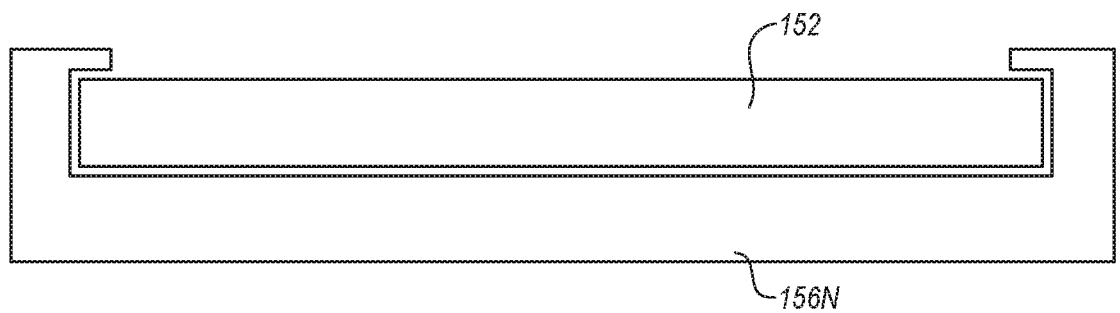

In another embodiment shown in FIGS. 17A and 17B, solar module 152 may be positioned (e.g., slid into—in a direction depicted by arrow 354) in a slot contained in standoffs or adhesion sheet (e.g., adhesion sheet 156N of FIG. 17A and FIG. 17B). The solar module 152 may be captured along three edges and an upper surface of the glass is open to sunlight (except for a narrow ridge capturing the module). The fourth edge may be secured with a fastener or latch (not shown). In one example, when the slide-in feature is part of the adhesion sheet, the adhesion sheet may be molded of plastic or rubber. The adhesion sheet may function as a bumper for the module providing protection when handling (e.g., if attached prior to handling) and may also provide the surface for adhesion to a roof. Removing the module later simply requires removing any fastener or latch and sliding the module out.

Figure 18:
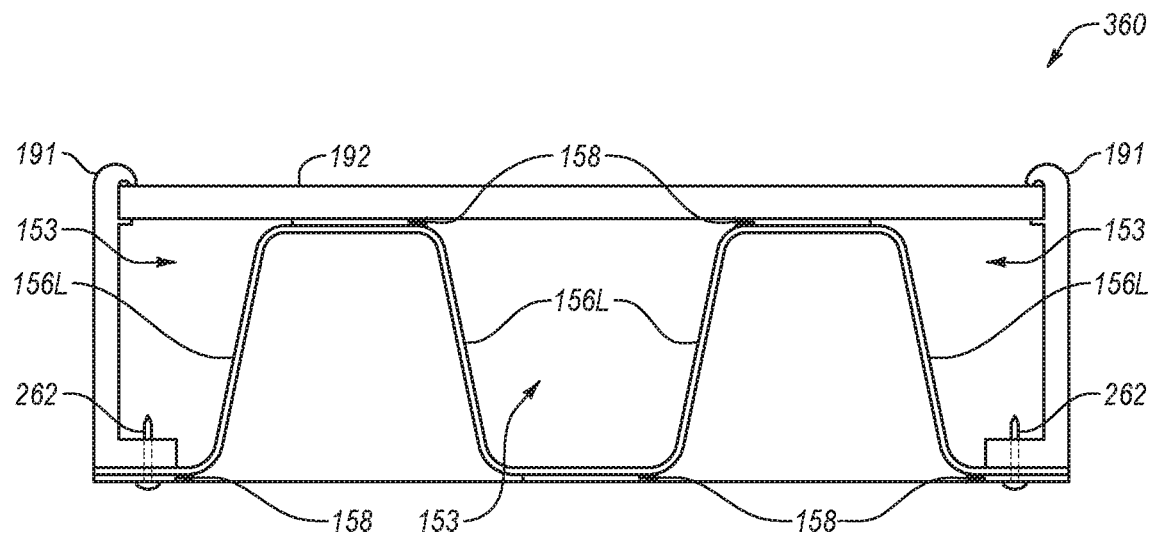
FIG. 18 illustrates another solar module mounting system including an adhesive and an adhesion sheet, in accordance with an embodiment of the present disclosure.

In another embodiment when the full area of an adhesion sheet is not needed to reliably adhere to the roof and provide sufficient structural support, the adhesion sheet may be a non-flat surface. For example, as illustrated in FIG. 18, a solar module mounting system 360 may include an adhesion sheet 156L including a corrugated surface. This embodiment may reduce costs (i.e., of an adhesion sheet) while still providing adequate adhesion surface and while improving the heat-sinking property of the adhesion sheet, pulling more heat from the cells. It will be readily apparent to one of ordinary skill in the art that the non-flat adhesion sheet may be corrugated, "square-wave" shape, "triangular-wave" shape, or any other shape that provides contact and heat-sinking to the back of the module.

Figure 19:
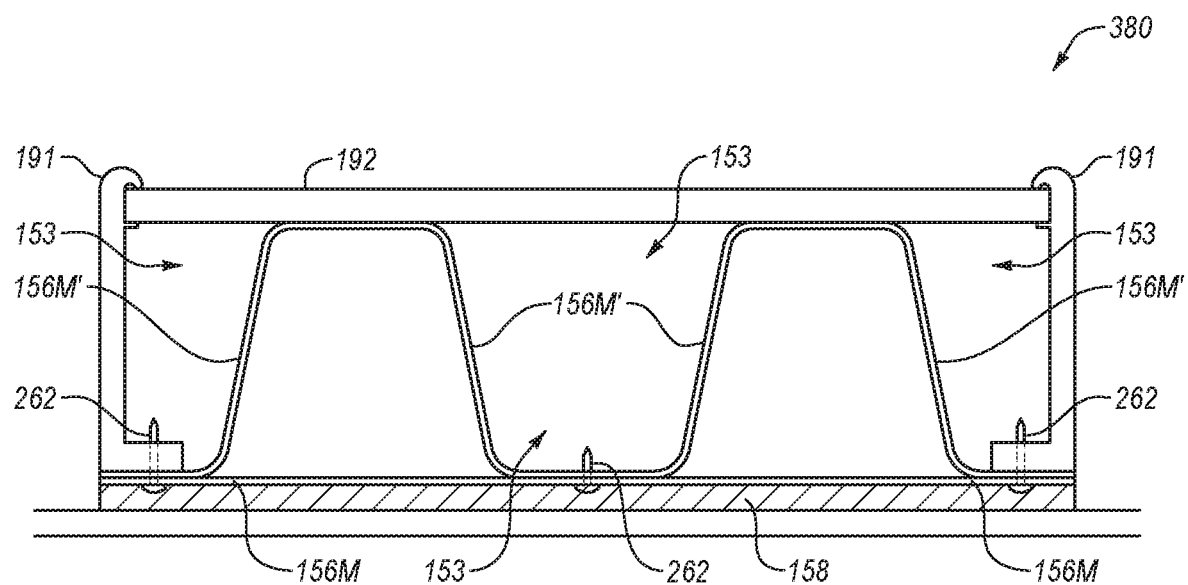
FIG. 19 illustrates another solar module mounting system including an adhesive and an adhesion sheet, in accordance with an embodiment of the present disclosure.

FIG. 19 depicts another embodiment of the present disclosure wherein a solar module mounting system 380 includes an adhesion sheet, which may include both a substantially flat portion 156M for an adhesion area and a non-flat (e.g., corrugated) portion 156M' configured to function as a heat sink.

In another embodiment, one or more clamps may attach to an adhesion sheet by sliding into slots stamped or cut in the adhesion sheet. Alternatively, attachment points may be adhered or welded to the adhesion sheet. This may reduce the cost of the adhesion sheet and/or clamps.

Figure 20:
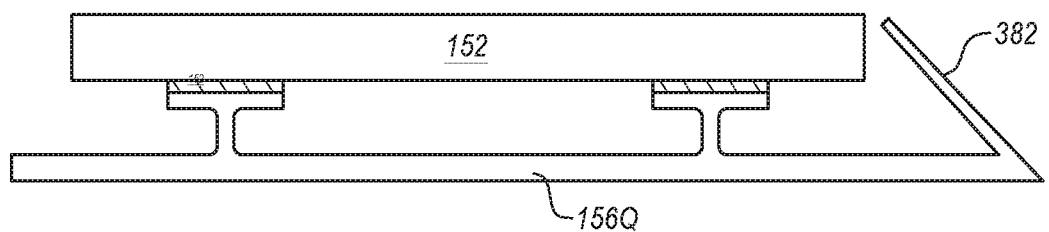
FIG. 20 depicts a solar module mounting system including a skirt, according to an embodiment of the present disclosure.

According to another embodiment, a skirt may be attached to an adhesion sheet or one or more clamps or standoffs. The skirt may provide enhanced aesthetics, for example, by hiding a lower edge of a solar array from an off the roof view, or it may provide wind deflection, or it may provide wire management. In general, the larger the air-gap or the distance between the adhesion sheet and the modules, the larger the upward wind loading may be under high winds. One or more skirts around the module or array may deflect the wind reducing the upward wind loading. Typically, each module has two wires coming off it and the modules are typically connected in series. It is desirable to minimize the amount of movement the wires may experience from wind to minimize abrasion and the likelihood of wearing away some of the insulation. The skirt may enable for managing the wires by keeping them neat, contained, hidden from view, and prevent movement in the wind. In one embodiment, the skirt may be part of the adhesion sheet. For example, an adhesion sheet 156Q may be folded up along one or more edges (e.g., a bottom edge) to create a skirt 382 as shown in FIG. 20.

Figure 21:
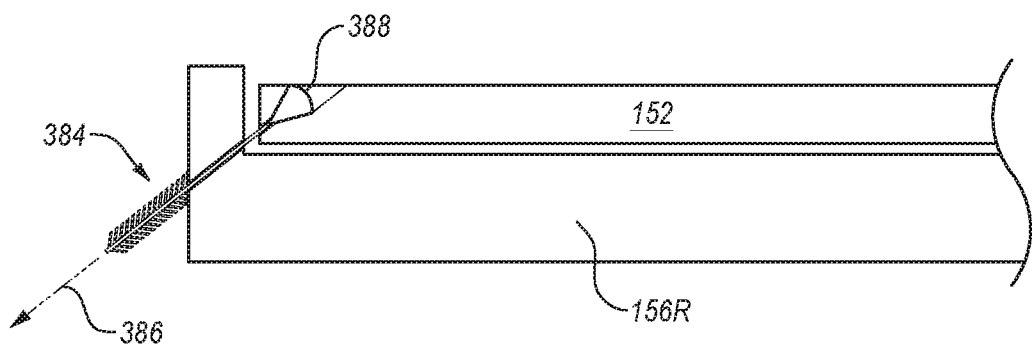
FIG. 21 depicts a solar module mounting system including a ratchet hold-down, in accordance with an embodiment of the present disclosure.

In another embodiment shown in FIG. 21, one or more clamps may comprise a ratchet hold-down 384 (e.g., zip ties or the like) that secure a solar module to one or more standoffs, clamps, or an adhesion sheet (e.g., adhesion sheet 156R) when secured (e.g., by an installer). The ratchet hold-down may comprise one-way flexible tabs or ridges that allow motion in one direction (e.g., as shown by arrow 386 in FIG. 21) but not in the opposite direction. Ratchet hold-down 384 may include a device 388 (e.g., a wedge-shaped piece of material) at one end that secures the module edge by pushing it down and/or toward the center of the adhesion sheet. An advantage of this embodiment may be that no tools (e.g., a wrench) is required to attach the module. The ratchet hold-downs may be made of a UV resistant plastic, metal, or any other suitable material. The one-way flexible tabs may be part of the ratchet hold-downs as shown, or may be part of the standoffs or adhesion sheet with ridges on the ratchet hold-downs that catch the tabs.

It is noted that by using frameless modules, adhesives, and non-conducting materials for the racking, all metal may be eliminated from a solar module mounting system, which may eliminate the need for grounding wires on a roof, thus, reducing cost and time for electrical work.

In another embodiment, an adhesion sheet may include one or more wire routing trays for PV wires between solar modules that protect and hide the wiring. A typical residential system includes one or two junction boxes where strings are combined on a roof and the PV wiring transitions to conduit wiring. In one embodiment of the present disclosure, wire management is included in the system. For example, the adhesion sheet may include loops or tabs where wires may be secured. In another example, one or more wiring junction boxes may be integrated with an adhesion sheet, or the adhesion sheet may include attachment points for one or more junction boxes and/or conduit.

Figure 22:
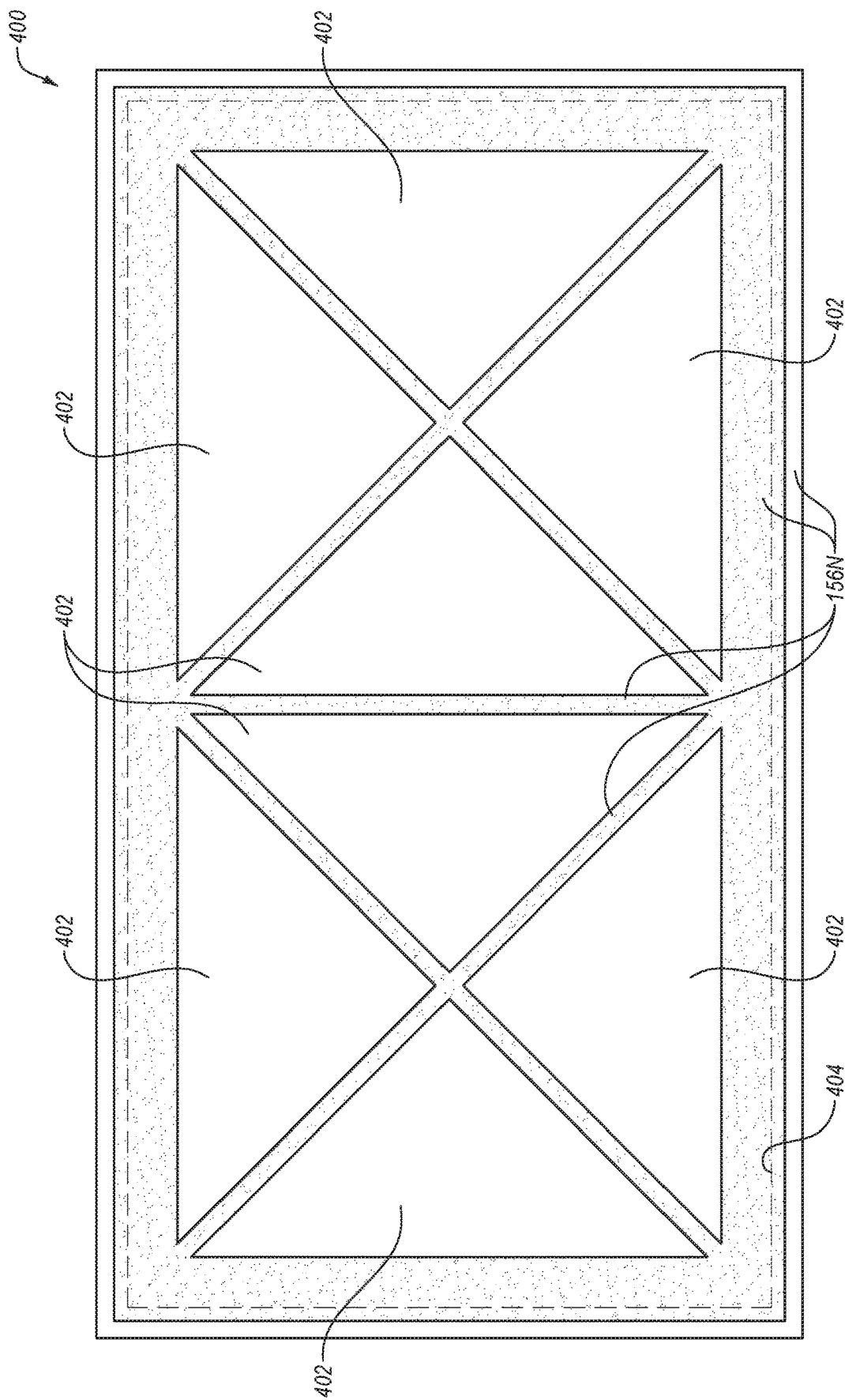
FIG. 22 illustrates another solar module mounting system including an adhesion sheet, according to an embodiment of the present disclosure.

According to another embodiment, an adhesion sheet may comprise a frame configured to support a solar module and provide cavities for an adhesive to adhere to a roof and an underside of the solar module. For example, with reference to FIG. 22, a solar module mounting system 400 includes adhesion sheet 156N and cavities 402, which, in this non-limiting embodiment, are triangular shaped. An adhesive may be applied to cavities 402. By way of example only, a foam adhesive may fill the volume of cavities 402. Dashed line 404 represents a solar module footprint.

In another embodiment, an adhesion sheet may include one or more adhesive injection ports 410 (e.g., see FIGS. 4 and 6). The injection ports 410 may be analogous to automotive lubrication ports that a grease gun may be mated with for injecting lubricant into moving parts, such as shaft bearings. The adhesive injection ports 410 may be mated with an adhesive injector that may include a pump and an adhesive supply. When enabled, the adhesive may be injected into the injection ports 410, which may guide the adhesive to different locations between the adhesion sheet and a roof. This may assure that an adequate amount of adhesive is used (e.g., the adhesive injector may include a means of measuring the volume of adhesive injected). For example, the adhesive may be applied to an entire adhesion sheet via a single adhesive port. This may enable the use of a more fluid adhesive (e.g., as compared to adhesive pads). A more fluid adhesive may fill gaps better providing better adhesion to the roof. When the adhesive cures it may become less fluid. Examples of fluid roof adhesives are Extreme WET PATCH® and Cold-Ap Roof and Lap Adhesive, each of which made by Henry Company of El Segundo, Calif. In another embodiment, the adhesive may comprise a foam material that may fill the gaps and volume. In another embodiment, the adhesive may comprise one or more peel-and-stick pad(s). Further, the adhesive may be applied to the roof, the adhesion sheet, or both, with an applicator such as a caulking gun, brush, or pressurized canister.

It is noted that the adhesion sheet and/or standoffs described herein, may be molded. For example, the adhesion sheet and/or standoffs may be injection molded, vacuum molded, or molded in any other fashion. In another embodiment, the adhesion sheet and/or standoffs may be milled or cut. The adhesion sheet and/or standoffs may be plastic, polymer, carbon fiber, fiberglass, metal, etc. In yet another embodiment, the adhesion sheet and/or standoffs may be fabricated with a form. For example, if the material is fiberglass or carbon fiber, a form may be created (e.g., from wood or metal) and one or more layers of material may be applied with a resin or epoxy to form the shape. Alternatively, the adhesion sheet and/or standoffs may be 3D printed with, for example, an extrusion, light polymerized, powder bed, laminated, wire technique, additive manufacturing, stereo lithography (SLA), resin printing, selective laser sintering (SLS), or any other 3D printing techniques. Alternatively, the adhesion sheet and/or standoffs may be extruded.

In many of the embodiments disclosed herein, the adhesion sheets shown are approximately 90% to 110% of the area of the solar modules. In another example, the area of the adhesion sheets may be more or less, for example, 50% of the area of the solar module. In general, the area of the adhesion sheet may be sufficiently large to secure a solar module to a roof under extreme wind and environmental conditions. The required area may depend on the holding properties of the adhesive and the structural capabilities of the shingles or tiles and their attachment to the decking. When a framed module is clamped onto a flat adhesion sheet, the adhesion sheet may be smaller than the openings on a back side of the module (e.g., an inch or two smaller than the outer dimensions of the module) in one dimension (length or width) so that there may be a gap between the bottom of the module frame and the roof in which the PV wires may be routed. Furthermore, for aesthetics, the amount that the adhesion sheets extend past the edges of the modules may be minimized.

Figure 24:
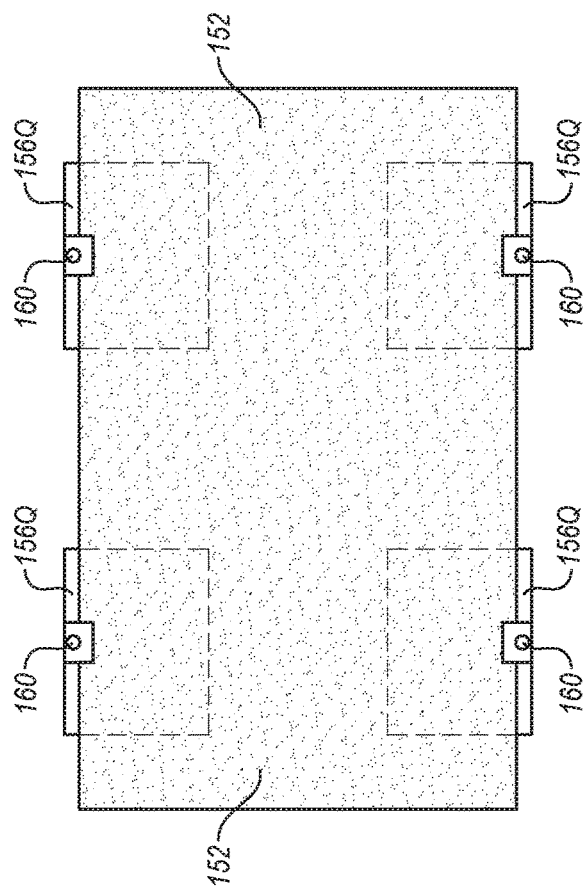
FIG. 24 illustrates another example configuration of a solar module coupled to a plurality of adhesion sheets via a plurality of clamps, according to an embodiment of the present disclosure.
Figure 23:
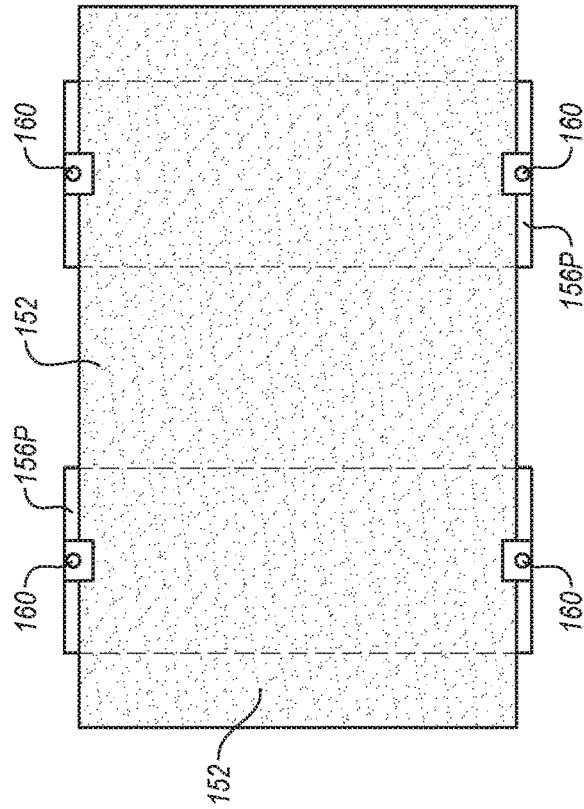
FIG. 23 illustrates an example configuration of a solar module coupled to a plurality of adhesion sheets via a plurality of clamps, according to an embodiment of the present disclosure.

In various embodiments disclosed herein, four clamps are attached to an adhesion sheet. In other embodiments, less than four clamps 160 (e.g., one, two, or three) may attach to one adhesion sheet as shown in FIGS. 23 and 24. Moreover, in other embodiments, more than four clamps may be attached to an adhesion sheet.

Figure 25:
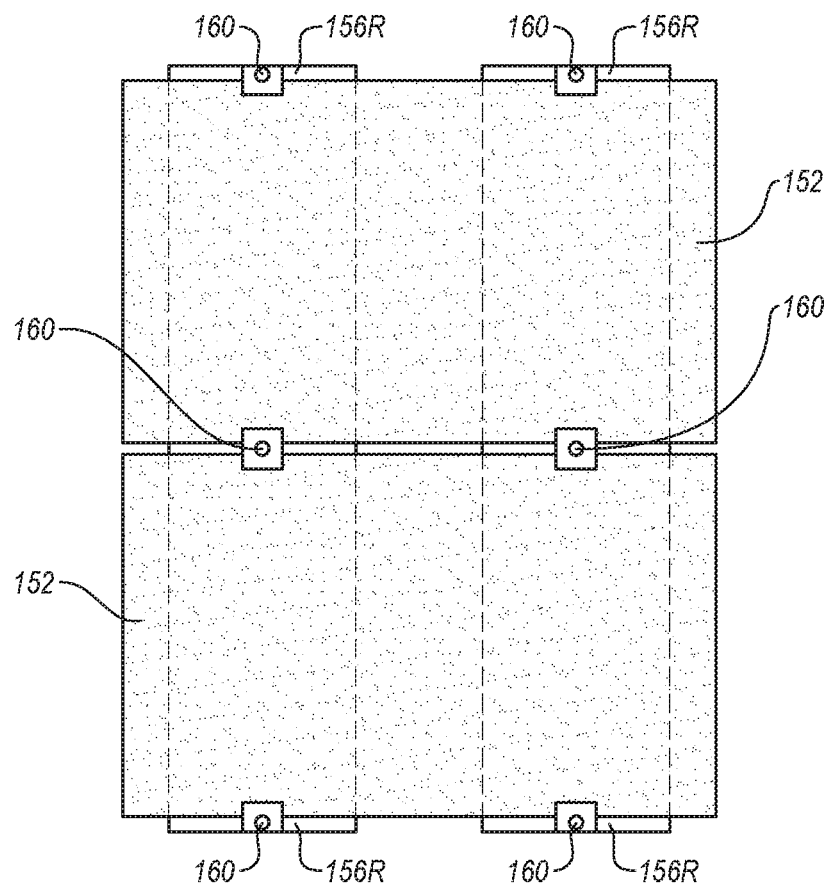
FIG. 25 illustrates an example configuration of a plurality of solar modules coupled to a plurality of adhesion sheets via a plurality of clamps, in accordance with an embodiment of the present disclosure.

As illustrated in the example shown in FIG. 25, an adhesion sheet may span multiple solar modules, which may reduce the number of parts and simplify the alignment of the solar modules. This may reduce the spacing between the modules slightly when there is a clamp in between the modules.

Figure 26:
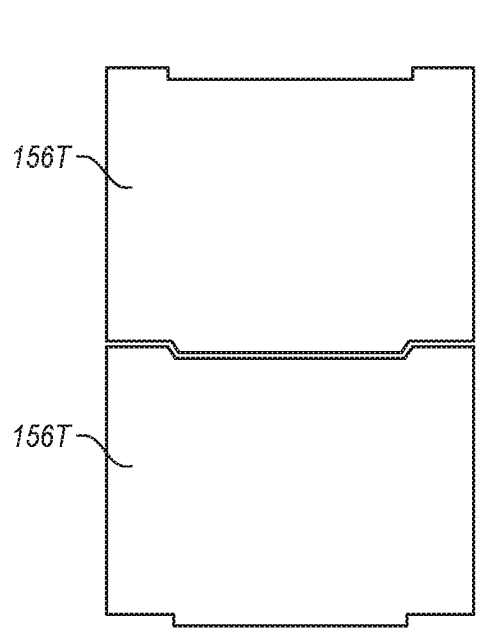
FIG. 26 depicts an example configuration of a plurality of adhesion sheets, according to an embodiment of the present disclosure.
Figure 27:
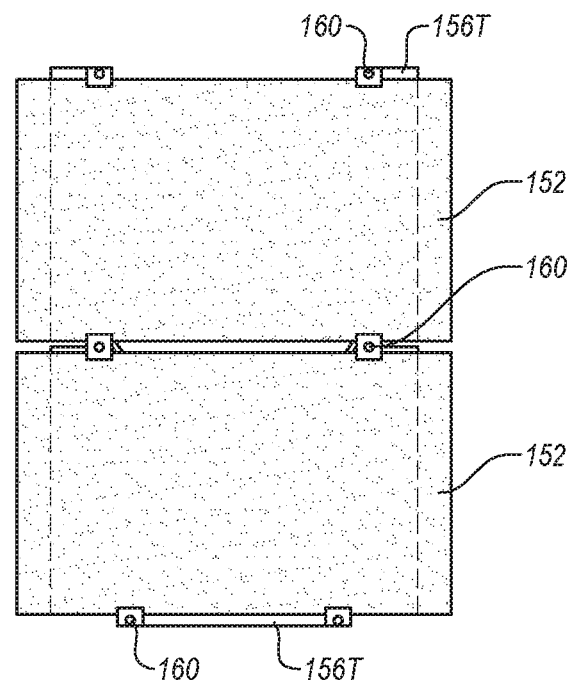
FIG. 27 illustrates an embodiment including a plurality of solar modules coupled to the adhesions sheets of FIG. 26.

With reference to FIG. 26, in another embodiment, adhesion sheets 156T may be interlaced to minimize the spacing between solar modules 152 when there are one or more clamps between solar modules 152 shown in FIG. 27. Clamps 160 positioned between solar modules 152 may be double clamps configured to support both modules with a single clamp.

In other embodiments, when the area of one or more adhesion sheets is small relative to the area of one or more solar modules, a mounting system may include a relatively small number of roof penetrations into the rafters or decking. In these embodiments, a number of roof penetrations may be much smaller than in a traditional mounting system because the adhesive provides some of the structural attachment strength so fewer penetrations may be needed. Further, the penetrations may be into the decking (e.g., plywood) as opposed to the rafters, as is usually required for conventional mounting systems. For example, screwing into the decking, as opposed to the rafters, may simplify the process of securing roof penetrations because locating the rafters can be challenging. In one embodiment of the present disclosure, the adhesion sheets may be attached to a roof with adhesive and at various portions (e.g., at a top and a bottom) with one or more attachment devices (e.g., lag bolts) secured to the decking. The attachment devices may then be covered with flashing.

Figure 28:
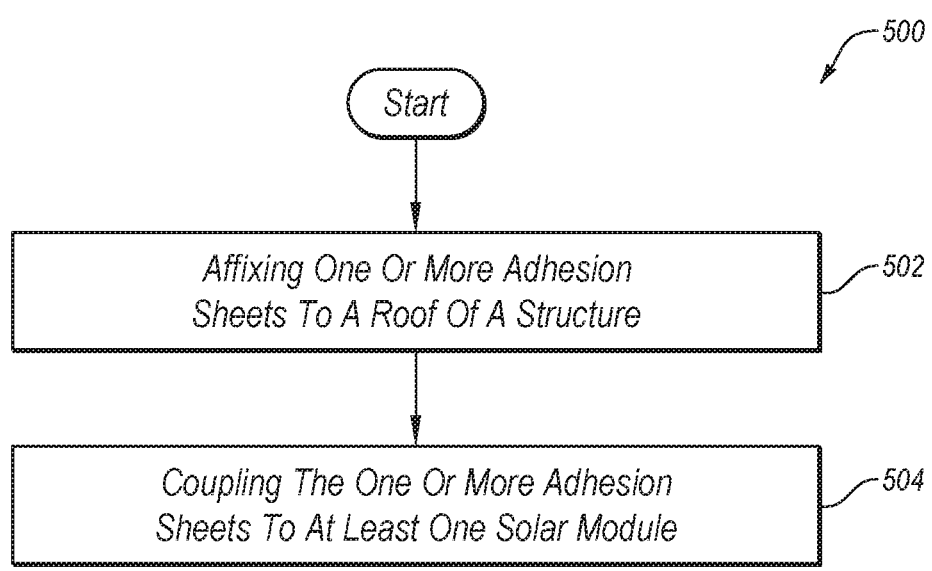
FIG. 28 is a flowchart depicting a method, according to an embodiment of the present disclosure.

FIG. 28 is a flowchart illustrating a method 500, in accordance with one or more embodiments. Method 500 may include affixing one or more adhesion sheets to a roof of a structure (depicted by numeral 502). Method 500 may also include coupling the one or more adhesion sheets to at least one solar module (depicted by numeral 504).

As described herein, the present disclosure includes various solar module mounting systems, which may include an adhesion sheet that may be adhered to a surface of a roof. Various embodiments do not require penetration of a roof's waterproof membrane, thus, reducing the likelihood of leaks and saving significant cost and time. An adhesion sheet may be attached directly to one or more modules with, for example, an adhesive, clamps, clamps plus supporting cross pieces such as racking rails ("rails"), snap-in tab(s), stand-offs, ratchet hold-downs, quarter-turn member(s), slide-in slots, or any combination thereof. As a solar module is mounted a greater distance from a surface of a roof (e.g., resulting in a greater air-gap), wind loading requirements of the adhesive and adhesion sheet may increase, possibly requiring a larger adhesion sheet area, more adhesive, other securing means (e.g., roof penetrations), one or more skirts, or any combination thereof.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A solar module mounting system, comprising:
an adhesion sheet configured to be secured to a roof of a structure via an adhesive and without penetrating the roof, the adhesion sheet including at least one of a molded sheet and a polymer sheet, the adhesion sheet further including at least one insert configured to be positioned adjacent the roof and to receive an attachment device; and
at least one clamp configured for securing at least one solar module and coupling directly to the adhesion sheet via the insert and the attachment device without penetrating the roof, the at least one clamp comprising a snap-in tab configured to: bend in response to pressure applied by the solar module; and snap back to a default position in response to the solar module being secured;
the adhesion sheet having an area of at least 50% of an area of the at least one solar module.

2. The solar module mounting system of claim 1, wherein the adhesion sheet includes at least one of a length and a width substantially equal to or greater than an associated dimension of the at least one solar module.

3. The solar module mounting system of claim 1, wherein the area of the adhesion sheet is at least 90% of the area of the at least one solar module.

4. The solar module mounting system of claim 1, wherein the adhesion sheet and the at least one clamp are configured such that a bottom surface of a frame of the at least one solar module contacts an upper surface of the adhesion sheet.

5. The solar module mounting system of claim 1, wherein the adhesion sheet and the at least one clamp are configured such that a bottom surface of the at least one solar module contacts an upper surface of the adhesion sheet.

6. A solar module mounting system, comprising:
an adhesion sheet configured to be secured to a structure without penetrating the structure, the adhesion sheet including at least one of a molded sheet and a polymer sheet, the adhesion sheet further including at least one catch configured to secure at least one edge of a solar module and at least one tab configured to secure at least one different edge of the solar module, each of the at least one catch and the at least one tab being part of the at least one of the molded sheet and the polymer sheet, wherein the at least one catch comprises a substantially non-bending catch and the at least one tab is configured to bend in response to pressure applied by the solar module.

7. The solar module mounting system of claim 6, wherein the adhesion sheet has an area of at least 50% of an area of the solar module.

8. The solar module mounting system of claim 6, wherein the adhesion sheet extends from beyond a first outer edge of the solar module to beyond a second, opposite, outer edge of the solar module.

9. The solar module mounting system of claim 6, wherein the tab comprises a snap-in tab configured to: bend from a default position in response to pressure applied by the solar module; and snap back to the default position in response to the solar module being secured.

10. The solar module mounting system of claim 6, wherein the adhesion sheet includes at least one of a length and a width substantially equal to or greater than an associated dimension of the solar module.

11. The solar module mounting system of claim 6, further comprising a compliant material coupled to at least a portion of the adhesion sheet and configured to be positioned between the adhesion sheet and the solar module.

12. The solar module mounting system of claim 6, wherein the adhesion sheet includes at least one standoff positioned between the structure and the solar module.

* * * * *